US011215965B2

(12) United States Patent
Eppler et al.

(10) Patent No.: US 11,215,965 B2
(45) Date of Patent: Jan. 4, 2022

(54) DEVICE AND METHOD FOR MONITORING THE RECEPTION STATE OF A WORKPIECE

(71) Applicant: CHIRON-WERKE GmbH & Co. KG, Tuttlingen (DE)

(72) Inventors: Claus Eppler, Messstetten (DE); Christoph Kempter, Neuhausen ob Eck (DE); Jens Koenig, Tuttlingen (DE)

(73) Assignee: CHIRON-WERKE GmbH & Co. KG, Tuttlingen (DE)

( * ) Notice: Subject to any disclaimer, the term of this patent is extended or adjusted under 35 U.S.C. 154(b) by 257 days.

(21) Appl. No.: 16/434,374

(22) Filed: Jun. 7, 2019

(65) Prior Publication Data

US 2019/0377320 A1 Dec. 12, 2019

(30) Foreign Application Priority Data

Jun. 8, 2018 (DE) ...................... 10 2018 113 741.9

(51) Int. Cl.
*G05B 19/402* (2006.01)

(52) U.S. Cl.
CPC .. *G05B 19/402* (2013.01); *G05B 2219/37002* (2013.01)

(58) Field of Classification Search
CPC ........ G05B 19/402; G05B 2219/37002; B23Q 17/2447; B23Q 17/006
See application file for complete search history.

(56) References Cited

U.S. PATENT DOCUMENTS

| 4,254,676 A | 3/1981 | Wilson |
| 2011/0018688 A1* | 1/2011 | Hanada ............. H04L 12/40013 340/10.1 |

(Continued)

FOREIGN PATENT DOCUMENTS

| DE | 102005002448 A1 | 7/2006 |
| DE | 102008014869 A1 | 9/2009 |

(Continued)

OTHER PUBLICATIONS

European Search Report for corresponding European Patent Application No. 19178779.5, dated Sep. 13, 2019.

(Continued)

*Primary Examiner* — Ziaul Karim
(74) *Attorney, Agent, or Firm* — Jason H. Vick; Sheridan Ross, PC

(57) ABSTRACT

A device for monitoring a mounting state of a workpiece in a machine tool. The device comprises an illumination arrangement for illuminating the working space in a normal mode of operation; at least one workpiece sensor, which is configured to detect an actual state of the workpiece in the workpiece mount in the working space, and to provide a monitoring signal which describes the actual state of the workpiece; and a control unit. The illumination arrangement is also operable in at least one signal mode of operation. The control unit is configured to determine, based on the monitoring signal, whether the workpiece is in a first mounting state or a second mounting state, and, based thereon, to selectively operate the illumination arrangement in the signal mode of operation to provide visual information in the working space for visualizing the mounting state of the workpiece.

20 Claims, 8 Drawing Sheets

(56) References Cited

U.S. PATENT DOCUMENTS

| | | | |
|---|---|---|---|
| 2013/0071198 A1 | 3/2013 | Kiryu et al. | |
| 2013/0206741 A1* | 8/2013 | Pfeifer | G01S 11/14 219/130.01 |
| 2016/0096227 A1 | 4/2016 | Hori et al. | |
| 2017/0046975 A1* | 2/2017 | Becker | G09B 19/003 |
| 2019/0244309 A1* | 8/2019 | Ottnad | G05B 19/41865 |

FOREIGN PATENT DOCUMENTS

| | | |
|---|---|---|
| DE | 102009038046 A1 | 2/2011 |
| DE | 102013106226 A1 | 12/2014 |
| DE | 102015116347 A1 | 4/2016 |

OTHER PUBLICATIONS

Examination Report for German Patent Application No. 10 2018 113 741.9, dated May 9, 2019.

* cited by examiner

DEVICE AND METHOD FOR MONITORING THE RECEPTION STATE OF A WORKPIECE

CROSS-REFERENCES TO RELATED APPLICATIONS

This application claims priority from German patent application 10 2018 113 741.9, filed on Jun. 8, 2018. The entire content of that priority application is fully incorporated by reference herewith.

The present disclosure relates to a device for monitoring the mounting state of a workpiece in a machine tool or a defined surrounding area of a machine tool. Further, the present disclosure relates to a machine tool that is equipped with such a device. In some embodiments, the present disclosure relates to a method for monitoring a mounting state of a workpiece. Eventually, the present disclosure also relates to a machine control program for a machine tool.

BACKGROUND

Devices of the aforementioned type are described in the art. They are frequently used in machine tools for machining metals or solid materials, especially in CNC machine tools. By means of such devices it can be differentiated whether a workpiece is located in the machine tool or in an associated surrounding area, or not. Furthermore, it can be ensured that a workpiece is in a position required for its machining.

The checking of the state is done via sensor technology. The sensors used are usually compressed air or dynamic pressure sensors which scan the workpiece (or the space intended for the workpiece) with an air jet from a sensor nozzle. By a subsequent evaluation of the resulting backpressure, among other things, a statement can be made about the presence and/or position of a workpiece in a workpiece mount. If the workpiece is mounted as intended, respective measurement values for the measured backpressure result. If, on the other hand, the workpiece is positioned incorrectly, deviating measurement values result, which indicate the incorrect fit.

Especially when producing single copies or small series, the machine tools are loaded manually. In this respect, the operator or worker himself is responsible for ensuring that the workpiece is loaded into the machine tool as intended. An appropriate supportive state monitoring of the workpiece is therefore helpful if precise production and error-free operation are to be guaranteed.

A feedback on the mounting state of the workpiece for the machine operator, for example on its position, is usually done via a control panel on the outer shell of a machine tool. Such a machine tool and device for workpiece monitoring are known, for example, from DE 10 2013 106 226 A1.

In view of this, it is an object of the present disclosure to refine monitoring devices and machine tools equipped with them in order to simplify the placement of workpieces.

It is a further object of the present disclosure to present monitoring devices and machine tools equipped with them to simplify the placement of workpieces with as little additional effort as possible, at least in certain embodiments.

It is a further object of the present disclosure to present monitoring devices and machine tools equipped with them which contribute to minimizing workpiece changing times.

It is a further object of the present disclosure to present monitoring devices and machine tools equipped with them which improve operator ergonomics as far as possible, at least in certain embodiments.

It is a further object of the present disclosure to present monitoring devices and machine tools equipped therewith which improve the quality and accuracy of machining, at least in certain embodiments.

It is a further object of the present disclosure to present monitoring devices and machine tools equipped with therewith, which increase the reliability of the machine tool as a whole, at least in certain embodiments.

It is a further object of the present disclosure to present a machine control program that sets up a machine tool to perform the method.

SUMMARY

In regard of the monitoring device, these and other objects are achieved by a device for monitoring the mounting state of a workpiece in a workpiece mount in a working space or in a defined surrounding area of a machine tool, wherein the device comprises:

an illumination arrangement for illuminating the working space in a normal mode of operation, at least one workpiece sensor which is configured to detect an actual state of the workpiece in the workpiece mount in the working space and to provide a monitoring signal which describes the actual state of the workpiece, and a control unit, wherein the illumination arrangement is further operable in at least one signal mode of operation, and wherein the control unit is configured to determine, on the basis of the monitoring signal, whether the workpiece is in a first mounting state or a second mounting state, and, based thereon, to selectively operate the illumination arrangement in the signal mode of operation to provide visual information in the working space for visualizing the mounting state of the workpiece.

In a further aspect of the present disclosure, the above and other objects of the present disclosure are achieved by a device for monitoring a mounting state of a workpiece in a workpiece mount in a working space of a machine tool, comprising:

an illumination arrangement operable for illuminating the working space in a normal mode of operation, wherein the illumination arrangement is further operable in at least one signal mode of operation, at least one workpiece sensor which is configured to detect an actual state of the workpiece in the workpiece mount and to provide a monitoring signal that describes the actual state of the workpiece, and a control unit that is configured to determine, on the basis of the monitoring signal, whether the workpiece is in a correct mounting state or an incorrect mounting state, and based thereon, operate the illumination arrangement in the signal mode of operation to provide visual information in the working space for visualizing the mounting state of the workpiece.

In regard of the machine tool, the above and other objects of the present disclosure are achieved by a machine tool comprising a frame, a working space with a workpiece mount for a workpiece, and a monitoring device for monitoring a mounting state of a workpiece in the workpiece mount the device, comprising an illumination arrangement operable for illuminating the working space in a normal mode of operation, wherein the illumination arrangement is further operable in at least one signal mode of operation, at least one workpiece sensor which is configured to detect an actual state of the workpiece in the workpiece mount and to provide a monitoring signal that describes the actual state of the workpiece, and a control unit that is configured to determine, on the basis of the monitoring signal, whether the workpiece is in a correct mounting state or an incorrect mounting state, and based thereon, operate the illumination arrangement in the signal mode of operation to provide visual information in the working space for visualizing the mounting state of the workpiece.

In accordance with certain embodiments, the device is operable for signaling and/or confirming the mounting state of the workpiece in the machine tool. The device utilizes the already installed illumination arrangement of the working space. In the ideal case, signaling on a control panel on the outside of the machine tool can be dispensed with. In order to receive feedback on the mounting state, the operator no longer has to move/lean back out of the working space. Instead, the operator or worker receives information on the mounting state in the machine tool's working space and can react immediately and correct the position of the workpiece if necessary. The workpiece changing time can be reduced. The operator is protected against ergonomically unfavorable movements of his body.

In other words, the monitoring device can, for example, confirm that the workpiece is correctly placed directly in the working space using the illumination already available there. Information is provided directly in the working space. The confirmation is carried out visually via light signals or flares. At least in an exemplary embodiment, the confirmation is carried out via the illumination of the working space, which is selectively activated via the control unit. In the normal mode of operation, the illumination illuminates the working space to ensure good visibility. In the at least one signal mode of operation, the illumination is used for information transmission to indicate to the operator/worker in the working space whether the workpiece has been correctly positioned or not.

In addition, in accordance with the above aspect, the device offers the advantage that no new (structural) components need to be installed. The control unit is configured to control the illumination arrangement in the working space and to provide the operator or worker with feedback on the mounting state of the workpiece via this illumination arrangement. A signal output on the control panel is no longer absolutely necessary, but can be carried out additionally. If necessary, even existing machine components, such as individual signal lights, can be dispensed with on the control panel. The device is suitable for retrofitting of existing systems. These can be easily retrofitted.

The actual state is a currently acquired (real) state. The target state is a desired state/goal. The different states relate to the desired correct mounting of the workpiece in the workpiece mounting. The monitoring device may then be used to determine and signal whether the workpiece has been picked up correctly or possibly incorrectly. This is represented by the recording status.

The illumination arrangement, at least in exemplary designs, comprises at least one light source, in particular a light source for generating polychromatic light, in particular at least one white light source. The illumination arrangement is configured to illuminate, in particular to illuminate the working space for the operator. In this way the observability and controllability are improved. Light sources include, for example, incandescent lamps, halogen lamps, LED lamps, fluorescent lamps and high-pressure sodium vapor lamps. White light involves, for example, the emission of broadband light with a suitable color temperature, such as daylight white or neutral white. In general, a suitable color or color temperature may be selected and adapted to the actual application.

The above design of the monitoring device is particularly suitable for monitoring workpieces, particularly in terms of their mounting state in the working area of the machine tool.

Furthermore, the device enables an ergonomically improved placement process. For checking the placement, the operator no longer has to lean back from the working space in order to recognize a confirmation signal via a display or other notification means on the outside of the machine tool. Rather, the operator can now check the mounting state of the workpiece directly during placement or during his stay in the working space or operating room of the machine tool.

Furthermore, the signals can also be used to provide state histories, for example, using a memory and evaluation unit.

The defined surrounding area is, for example, a buffer storage, a replaceable mounting device temporarily located outside the working space, and/or a mount for the workpiece at a handling device which then mounts the working space.

In an exemplary embodiment, the control unit assigns the actual state to the first mounting state if the actual state corresponds with a target state, and the control unit assigns the actual state to the second mounting state if the actual state does not correspond with the target state. For example, the target state is defined as the correct mounting of a workpiece in a clamping nest. If the workpiece has the correct placement in the clamping nest, the actual state and the target state coincide. The control unit then assigns the actual state to the first mounting state. If, on the other hand, the placement is not correct because, for example, a clamping jaw does not hold the workpiece correctly, it is assigned to the second mounting state. This can also imply that the second mounting state is selected if there is no workpiece at all in the workpiece mount.

In another exemplary embodiment, the control unit operates the illumination arrangement in the signal mode of operation if the actual state is assigned to the first mounting state, i.e. if the monitoring signal indicates that the workpiece is in the first mounting state. The mode of the illumination arrangement is therefore only switched from the normal mode of operation to the signal mode of operation when the actual state of the workpiece corresponds to the target state. For example, the signal mode of operation is only activated when the workpiece has been correctly placed with respect to all the fasteners provided.

In an advantageous embodiment, the illumination arrangement is integrated into the working space. Furthermore, in certain embodiments, signals emitted by the illumination arrangement are visible in the working space. Usually, the working space of a machine tool is equipped with an illumination arrangement anyway, which makes it easier for the operator to monitor the machining of the workpiece. In principle, it is also conceivable to have an illumination of the working space via an illumination arrangement outside the working space, but here the worker is often hindered by shading effects.

In a further advantageous embodiment, the illumination arrangement is operable in a first signal mode of operation and in a second signal mode of operation, wherein the control unit operates the illumination arrangement in the first signal mode of operation if the actual state is associated with the first mounting state, and wherein the control unit operates the illumination arrangement in the second signal mode of operation when the actual state is associated with the second mounting state. This means that the mode of the illumination arrangement is changed from the second to the first signal mode of operation once the actual state of the workpiece corresponds with the target state. For example, it is intended that the illumination arrangement of the device is operated in the normal mode of operation as long as there is no workpiece at all in the working space of the machine tool. Exemplary embodiments provide that the illumination arrangement is operated in the second signal mode of operation when the workpiece sensor detects a workpiece but the workpiece is not yet in the target state. Once the operator has brought the workpiece to the target state, the mode of the illumination device is changed once again to the first signal mode of operation to confirm this.

According to an exemplary embodiment, the illumination arrangement can be operated to emit visual binary or three-step signals over time. For example, it is conceivable to operate the illumination arrangement in three time stages. The three stages of operation of the illumination arrangement are understood to mean, for example, that the illumination arrangement can be activated for a first period of time and a second period of time and can be deactivated for a third period of time. For example, the first period of time is longer than the second period of time and, for example, the second period of time is longer than the third period of time. For example, in the signal mode of operation, the illumination of the illumination arrangement can be activated for five seconds, then deactivated for one second, reactivated for 2.5 seconds and then deactivated again for one second. However, this is for illustrative purposes only and is not intended to be restrictive. In this respect, the three-stage operation corresponds to a light-Morse mode. Other signal sequences are conceivable.

In another exemplary embodiment, the signal mode of operation of the device comprises selective deactivation and/or activation of the illumination arrangement. It is conceivable that the illumination arrangement is continuously activated in the normal mode of operation and is deactivated (at least briefly) when switching to the signal mode of operation. In principle, the duration of the illumination deactivation can be arbitrary. However, a merely brief switch-off and a soon return to the normal mode of operation are advantageous, as the operator or worker will then find an almost completely and permanently illuminated working space even during the workpiece machining. In order to make it clear to the operator or worker that the actual state of the workpiece corresponds to the target state, the signal mode of operation can also include repeated deactivation or activation of the illumination arrangement (pulsating illumination). The illumination can flash, for example, for a pre-defined time as soon as the desired mounting state has been reached.

In a further embodiment of the device, the signal mode of operation comprises a change in illumination intensity and/or illumination color. For example, the control unit initiates a short change of the illumination color (for example, from white to green, or from red to green) if the desired target state is reached and the illumination arrangement is operated in the signal mode of operation. The illumination intensity can be varied analogously to the activation/deactivation (single pulse or pulsation).

According to another exemplary embodiment, the actual state includes a state variable selected from the group comprising of the following: presence, absence, position, orientation, a clamping state of the workpiece and any combinations thereof. The same applies to the target state. For instance, it is conceivable that the control unit derives from the monitoring signal provided by the at least one workpiece sensor, which describes the actual state of the workpiece, whether the workpiece is placed in the workpiece mount in the correct position and alignment. Furthermore, the control unit can be configured to detect whether a workpiece is clamped firmly enough by means of the monitoring signal.

According to another exemplary embodiment of the device, the at least one workpiece sensor is a mechanical, optical, inductive and/or electrical displacement sensor, pressure sensor and/or force sensor. As an example, the pressure sensor is configured as a dynamic pressure sensor. Using dynamic pressure sensors, it is easy to check whether a workpiece is correctly positioned or clamped. This enables, for example, malfunctions of a workpiece clamping unit to be detected during operation and taken into account by the control unit.

In a further exemplary embodiment, the device further comprises an input unit adapted to receive operator inputs/selections intended for the control unit for controlling the illumination arrangement. Operator inputs are understood to comprise, for example, a concrete selection concerning one or more temporal, spatial and/or colored signals or signal sequences for confirmation or general feedback on the mounting state. Further, user information may also include information as to whether the user, i.e. the worker or operator, wishes a second signal mode of operation (fault indication) in addition to the first signal mode of operation. It is understood that the input unit may form part of the device, but may also be operated as a unit separate from the device.

As an example, the control unit is configured to control an illumination arrangement in a loading space of a machine tool. This applies For instance to such machine tools in which the working space comprises the actual working area in which the machining takes place as well as a loading area in which a workpiece change takes place. For this purpose it is conceivable to equip the machine tool with at least two workpiece mounts which can be moved between a loading position and a machining position. For instance, the control unit may be configured to selectively operate the illumination arrangement in the loading area in signal mode of operation depending on the monitoring signal provided by the at least one workpiece sensor in order to also provide visual information in the loading area to visualize the mounting state of the workpiece.

The illumination arrangement in the working space or loading area preferably comprises one or more light emitting diodes (LEDs). On the one hand, the comparatively long service life of LEDs provides low-maintenance illumination. On the other hand, the heating of LEDs during operation is less important. Other technical solutions for light signaling can also be used.

The above and other objects of the present disclosure are also achieved by a machine tool, comprising
   a frame,
   a working space with a workpiece mount for mounting a workpiece, and
   a monitoring device in accordance with at least one embodiment described herein that is adapted to monitor the mounting state of the workpiece in the mount.

The machine tool is configured, for example, as lathe, milling machine, laser machine (laser processing machine), and/or as a combined machine for lathing, milling and/or laser processing. For instance, it is a so-called multi-axis machine with a plurality of controlled axes. For instance, the machine tool comprises an enclosure with a closable opening that allows access to the working space. Basically, however, there can also be other types and designs of machine tools. The frame can also be called a machine bed.

In regard of the method, the above and other objects of the present disclosure are achieved by a method for monitoring a mounting state of a workpiece in a workpiece mount in a working space or a defined surrounding area of a machine tool. The method comprises the steps of:

operating an illumination arrangement in a normal mode of operation to illuminate the work space, mounting a workpiece in the workpiece mount in the working space, identifying the actual state of the workpiece in the workpiece mount in the working space, providing a monitoring signal describing the actual state of the workpiece, determining, on the basis of the monitoring signal, whether the workpiece is in a first mounting state or a second mounting state, and based thereon, selectively operating the illumination arrangement in a signal mode of operation to provide visual information in the working space for visualizing the mounting state of the workpiece.

The above and other objects of the present disclosure are also achieved by a machine control program comprising program code means configured to cause a control unit of a machine tool to carry out the steps of the method in accordance with an exemplary embodiment of the present disclosure when the machine control program is carried out on the control unit.

The above and other objects of the present disclosure are also achieved by a machine control program having program code that is adapted to cause a control device of a machine tool to perform the steps of the procedure according to one of the aspects mentioned herein when the machine control program is executed on the control device.

A computer program/machine control program may be stored/distributed on a suitable non-transitory medium, such as an optical storage medium or a solid-state medium supplied together with or as part of other hardware, but may also be distributed in other forms, such as via the Internet or other wired or wireless telecommunication systems.

It is to be understood that the previously mentioned features and the features mentioned in the following may not only be used in a certain combination, but also in other combinations or as isolated features without leaving the spirit and scope of the present disclosure.

BRIEF DESCRIPTION OF THE DRAWINGS

Further features and advantages of the disclosure are disclosed by the following description of a plurality of exemplary embodiments, with reference to the drawings, wherein.

DETAILED DESCRIPTION OF EXEMPLARY EMBODIMENTS

Figure 1:
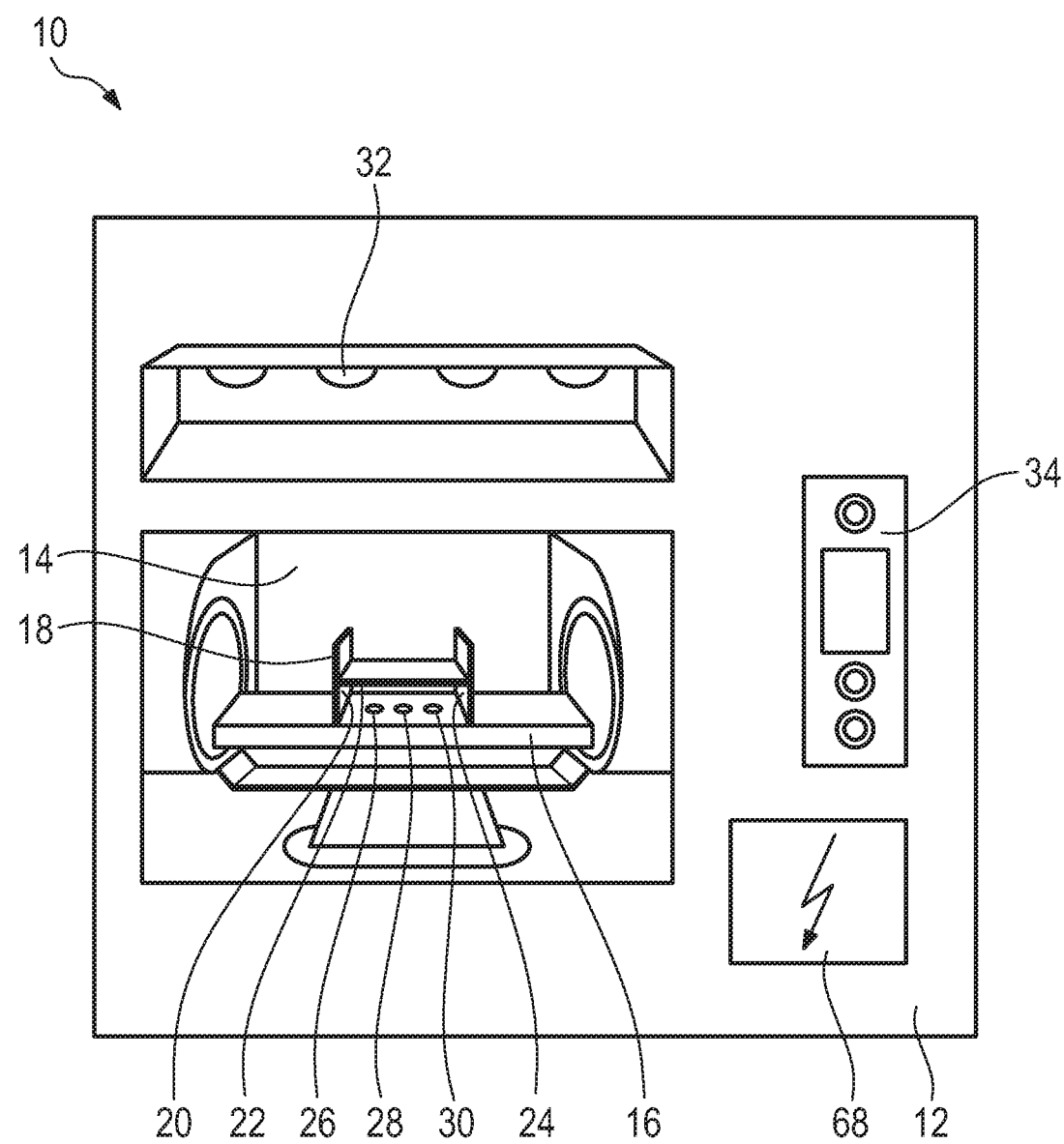
FIG. 1 is a perspective view of an exemplary embodiment of a machine tool.

FIG. 1 shows a perspective view of an exemplary embodiment of a machine tool 10. The machine tool 10 shown comprises a frame 12 which encloses a working space 14, wherein in the working space 14 there is arranged a cradle plate 16 with a workpiece mount 18 for mounting a workpiece (designated by 50 in FIGS. 3B-3C). Furthermore, the machine tool 10 comprises an illumination arrangement 32 and a control panel 34 located on the outside of the machine frame. In the illustrations in FIG. 1, FIG. 2, and FIG. 5, no workpiece is shown for illustrative purposes.

The workpiece mount 18, for example, has three stops. The workpiece is then correctly placed in the workpiece mount 18 when certain contact surfaces/contact points of the workpiece are in contact with the stops 20, 22 and 24. Whether the workpiece is correctly placed in the workpiece mount 18 is checked with the aid of three workpiece sensors 26, 28, 30 located at the bottom of the cradle plate 16. It is to be understood that in alternative embodiments, more or less workpiece sensors are installed in the workpiece mount 18.

The workpiece sensors 26, 28, 30 in this exemplary embodiment are dynamic pressure sensors. The vicinity of the sensors 26, 28, 30 is scanned by measuring nozzles. The resulting dynamic pressure indicates the presence, orientation and/or dimensional accuracy of an inserted workpiece. The measurements of the sensors 26, 28, 30 are transmitted as monitoring signals to the machine control. The machine control comprises, for example, a control unit which is indicated in FIG. 1 by a block with reference sign 68.

The machine control or control unit 68 of the machine tool 10 evaluates the monitoring signals. For instance, the actual state of the workpiece determined by the sensors 26, 28, 30 is assigned to a first or a second mounting state in the evaluation. If the actual state detected by one of the sensors 26, 28, 30 is assigned to the first mounting state on the basis of the respective monitoring signal, this means that the control unit 68 assumes that the workpiece is, at least at the respective positions of the sensors, in the target state, for example is correctly positioned in the part of the workpiece mount monitored by this sensor. If each of the sensors 26, 28, 30 provides a respective monitoring signal which leads to an assignment to the first mounting state, the control unit 68 assumes that the workpiece has been placed entirely correct. Otherwise, the control unit 68 assumes that a position correction or repositioning of the workpiece has to be performed before starting the workpiece machining, or that no workpiece has been inserted yet.

In principle, it is also conceivable that not every determined actual state must be assigned to a first mounting state in order to assume a correct mounting of the workpiece. For instance, when using a large number of sensors, which possibly also comprise redundant sensors, it is conceivable that the control unit 68 may assume that the workpiece is correctly seated even with a predetermined, smaller number of assignments of the respectively detected actual states to the first mounting state (i.e. to the target state).

The control device 68 controls the illumination arrangement 32 on the basis of the assignments or monitoring signals. If no workpiece has been placed in the workpiece mount 18 of the working space 14, the illumination arrangement 32 is operated in the normal mode of operation. For example, the working area 14 is fully illuminated in the normal mode of operation to make it easier for the operator to load the machine tool and visually monitor the operation of the machine tool.

If, in response to position monitoring by the control unit 68, it is determined that the workpiece is in the correct position, control unit 68 changes the mode of the illumination arrangement 32 from normal operation mode to a (first) signal mode of operation. Thus, the operator or worker recognizes from the illumination arrangement 32 of the working space whether he has correctly inserted the workpiece in the workpiece mount. The illumination arrangement 32 confirms the insertion of the workpiece or the mounting in the workpiece mount 18. A reassurance on the basis of a feedback/confirmation via the control panel 34 (provided outside the working space 14) or other indicator lights outside the working space 14 is not absolutely necessary.

Figure 2:
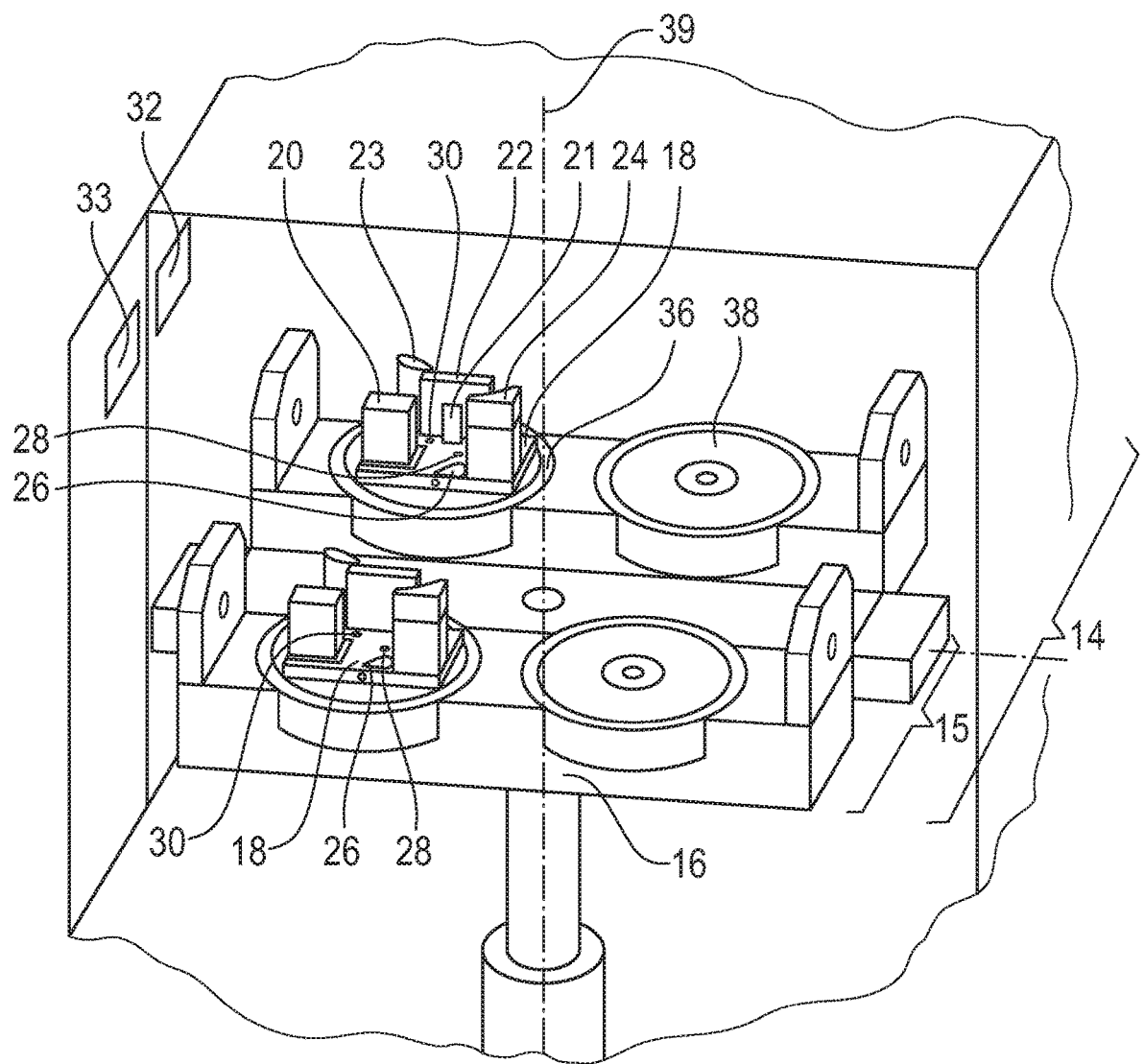
FIG. 2 is a perspective view of an exemplary embodiment of a working space of a machine tool.

With reference to FIG. 2, there is illustrated an embodiment of a working and loading space of an exemplary embodiment of a machine tool. The working space 14 comprises the actual working area in which the machining takes place as well as a loading area, designated by 15 in FIG. 2, in which a workpiece change takes place. In the spirit of the present disclosure, the term "working space" must therefore not be interpreted as restricting. The working space also covers areas in which a workpiece change (still in the machine tool) takes place. The same applies to the loading area, which can also be located outside the actual machine tool.

In working space 14 or in its loading space 15 there are provided cradle plates 16 each comprising two face plates 36 and 38. On each face plate 36, 38 there is a workpiece mount 18 in the form of a clamping nest. This embodiment is only of exemplary nature.

The cradle plates 16 are located on a round tower which can be rotated about a vertical axis 39. After mounting a clamping nest 18 with a workpiece in the loading space 15, the worker can rotate the round tower by 180° so that the workpiece is in the actual working area of the working space 14. The illumination arrangement 32 of the working space 14 is equipped with a lighting unit for the loading area 15, which is designated by 33. The clamping nests 18 are equipped with various stops 20, 22, 24. Furthermore, the clamping nest 18 contains various clamping elements 21, 23 for fixing the workpiece, as well as workpiece sensors 26, 28, 30 for detecting the workpiece.

The sensors 26, 28, 30 are configured to detect the mounting state of the workpiece in the workpiece mount 18. The workpiece sensors 26, 28, 30 provide a respective signal to the control unit 68 of the machine tool. The control unit 68 evaluates the signal. Depending on the evaluation result, the control unit 68 (which is not explicitly shown in FIG. 2) then sets the mode of the illumination arrangement 32 in the working space 14.

For instance, it is conceivable that the illumination arrangement 32 in the working space 14 or the lighting unit 33 in the loading space 15 can each be operated with three illumination modes.

As long as no workpiece is clamped on the clamping nests 18, the lighting unit 33 in loading space 15 or, more generally, illumination arrangement 32 in working space 14 is operated in the normal mode of operation. If there are workpieces in the workpiece mounts 18, it is switched to a first or a second signal mode of operation, depending on the fit of the workpiece in the workpiece mount 18.

If, for example, the workpiece is correctly seated in the workpiece mount 18 in the working space 14, the illumination arrangement 32 is operated in the first signal mode of operation. The same applies to a workpiece in the loading area 15.

Figure 3A:
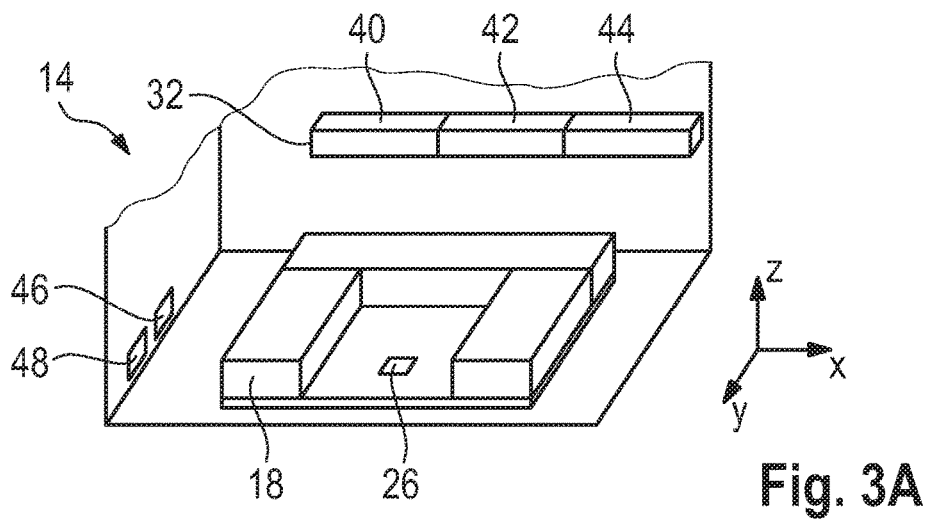
FIGS. 3A-3E are various views of another exemplary embodiment of a working space of a machine tool.

FIG. 3A shows a perspective, highly simplified view of a second embodiment of a working space 14 of a machine tool. The working space 14 comprises a U-shaped workpiece mount 18 with a base, three workpiece sensors 26, 46 and 48 as well as an illumination arrangement 32. The workpiece sensor 26 is a dynamic pressure sensor which is integrated in the base of the workpiece mount 18. The sensors 46 and 48 are each sensors of a light barrier.

The dynamic pressure sensor 26 is configured to detect the presence or absence of a workpiece in the workpiece mount 18. The light-barrier sensor 46 is configured to determine the height of the workpiece in the workpiece mount, while the light-barrier sensor 48 is configured to determine the position of the workpiece on the base in the workpiece mount 18.

Feedback on the fit of the workpiece in the workpiece mount 18 is provided to the worker via three illumination elements 40, 42, 44 of the illumination arrangement 32. The illumination arrangement 32 can be operated in this embodiment in three modes: A normal mode of operation, a first signal mode of operation and a second signal mode of operation. In which of the three modes the illumination arrangement is operated depends on the evaluation of the signals of the workpiece sensors 26, 46 and 48 by the control unit 68.

In principle, the illumination arrangement 32 is operated in the normal mode of operation as long as there is no workpiece in the workpiece mount. If the workpiece sensor 26 does not detect a workpiece in the workpiece mount 18, the illumination elements 40, 42, 44 are operated in the normal mode of operation. In this embodiment, the illumination elements 40, 42, 44 are operated continuously in the normal mode of operation.

In the working space 14, in this mode of operation there are activated continuously all three illumination elements (e.g. LEDs) of the illumination arrangement 32.

Figure 3B:
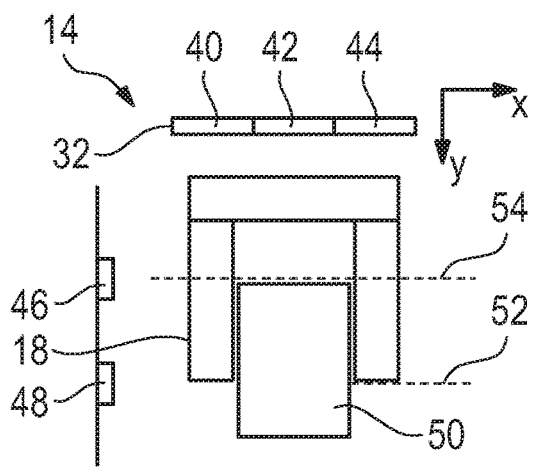

FIG. 3B shows a top view of the working space according to FIG. 3A. For instance, FIG. 3B shows a workpiece 50 which has not yet been correctly placed in the workpiece mount 18. As can be seen, the workpiece 50 protrudes from the front of the workpiece mount 18. This leads to an interruption of the light beams 52 of the light barrier. Accordingly, the light sensor 48 cannot detect the signal 52.

The control unit 68 interprets this to indicate that the workpiece 50 has not been correctly placed with respect to its position in the x-y plane. It is also shown that the workpiece does not interfere with the light signal 54 to the light sensor 46, i.e. does not protrude beyond the workpiece mount 18 in the z-direction. The control unit 68 confirms this via the second signal mode of operation of the lighting unit 32. If the light signal 52 is disturbed but the light signal 54 is not disturbed, the illumination elements 40 and 44 are switched off. The illumination element 42 remains lit.

Figure 3C:
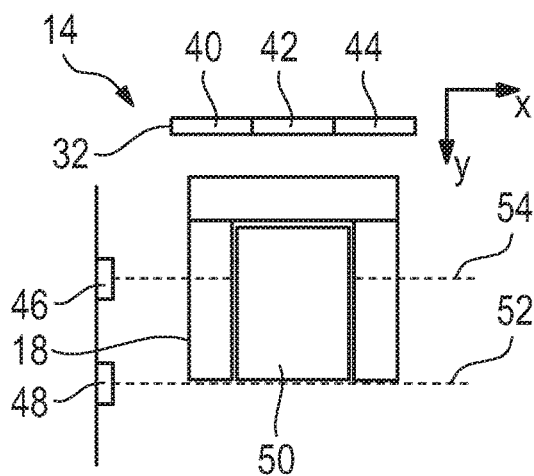

This illumination indicates to the operator that he has to correct the workpiece in the x-y plane. FIG. 3C also shows a top view of the working space 14. In this figure it can be seen that the workpiece is correctly seated in the workpiece mount. Neither the light signal 52 nor the light signal 54 are interrupted. Accordingly, control unit 68 specifies for the illumination arrangement 32 the first signal mode of operation, in which in this embodiment all three illumination elements 40, 42, 44 are briefly switched off at least once in order to confirm the correct mounting of the workpiece 50.

Figure 3D:
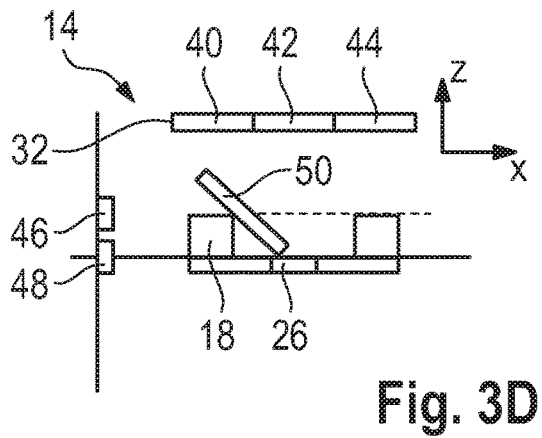

FIG. 3D shows a side view of the working space according to FIG. 3A. As can be seen in FIG. 3D, the workpiece 50 protrudes from the workpiece mount 18 in the z-direction and thus interrupts the light signal. From the interruption of the light signal 54 the control unit 68 recognizes that the position of the workpiece in the z-direction still has to be corrected. The incorrect fit of the workpiece 50 causes the control unit 68 to set the mode of the illumination arrangement 32 to be the second signal mode of operation.

In this exemplary embodiment of the machine tool, the second signal mode of operation comprises several sub-modes. Incorrect positioning in the x, y or z direction is confirmed differently. Accordingly, if the workpiece 50 is incorrectly placed in the z-direction, the illumination elements 40 and 44 are not switched off but the illumination element 42 is switched off. The operator therefore receives information not only about the fact that the workpiece 50 is incorrectly placed, but also about the extent to which the workpiece 50 is incorrectly placed.

Such an illustration can be achieved not only by the spatial distribution of the illumination, but also by a temporally varying illumination, for example in the form of Morse signals or similar (light) signal sequences.

Figure 3E:
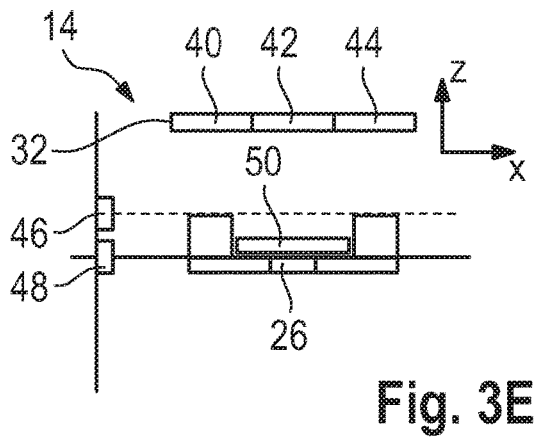

FIG. 3E shows a side view of the working space according to FIG. 3D, where it can be seen that the workpiece 50 is correctly positioned in the workpiece mount 18 shown.

Figure 4:
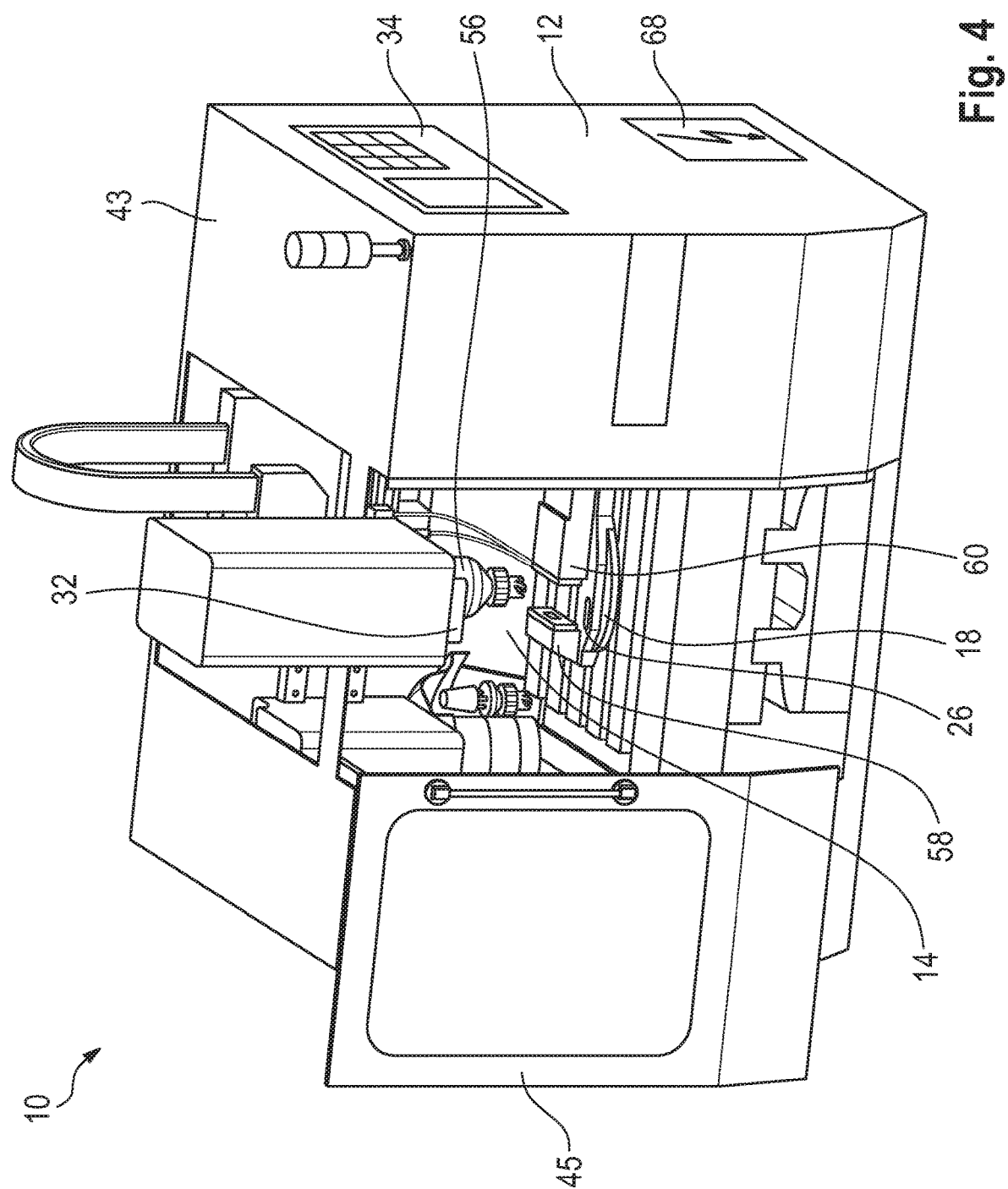
FIG. 4 is a perspective view of another exemplary embodiment of a machine tool.

FIG. 4 shows a perspective view of another exemplary embodiment of a machine tool 10. The machine tool 10 shown is a milling machine. It has a frame 12 which defines a working space 14. The machine tool 10 also has a housing 43 that encloses the working space 14. The working space 14 can be closed by a safety door 45. The safety door 45 thus forms a closable opening of the housing 43. A workpiece mount 18 is located in the working space 14. In the state shown in FIG. 4, above the workpiece mount 18 there is provided a machining head 56, which carries a tool for machining the workpiece (for reasons of illustration, no workpiece is shown in FIG. 4). In the exemplary embodiment shown in FIG. 4, the loading area and the machining area in the working space 14 are overlapped. In other words, there is no additional isolated loading position for the workpiece mount 18. Furthermore, a control panel 34 and a control unit 68 are indicated in FIG. 4.

There is provided in the working space an illumination arrangement 32 for illuminating, for instance, the machining head 56 and the workpiece mount 18. The clamping nest 18 comprises two clamping jaws 58 and 60, each of which can be moved on a rail. The clamping jaws 58 and 60 are configured to clamp a workpiece and thus enable precise machining of the workpiece with the machining head 56.

Workpiece sensors 26 and 28 (not explicitly shown in FIG. 5) integrated in the clamping jaws 58 and 60 can be used to check whether the workpiece has been clamped correctly.

The control unit 68 receives and checks the signals detected by the workpiece sensors 26 and 28 and determines whether the workpiece has been correctly clamped in the workpiece mount. This can be done, for example, on the basis of reference values. The required reference values can be entered or selected via the control panel 34 or other interfaces. Depending on the result of the comparison with the reference data, the control unit 68 controls the illumination arrangement 32. As long as the evaluation shows that there is no correctly clamped workpiece in the workpiece mount, the illumination arrangement 32 is operated in normal mode of operation (i.e. for lighting purposes). In this mode, the illumination arrangement 32 illuminates the working space 14 continuously.

If, on the other hand, the control unit 68 finds that a workpiece is placed as desired between the clamping jaws 58 and 60, the control unit 68 switches to the illumination mode. The normal mode of operation is turned off and replaced by a first signal mode of operation. In the first signal mode of operation, the illumination arrangement flashes for five seconds before returning to continuous illumination. Flashing in this case means repeatedly switching the illumination on and off at a defined frequency, for example at 0.5-second intervals.

The flashing indicates to the operator that the workpiece has been correctly inserted and that the machining process can begin. The safety door 45 can then be closed without the operator having to look at the control panel 36 on the outside of the machine tool 10.

Figure 5A:
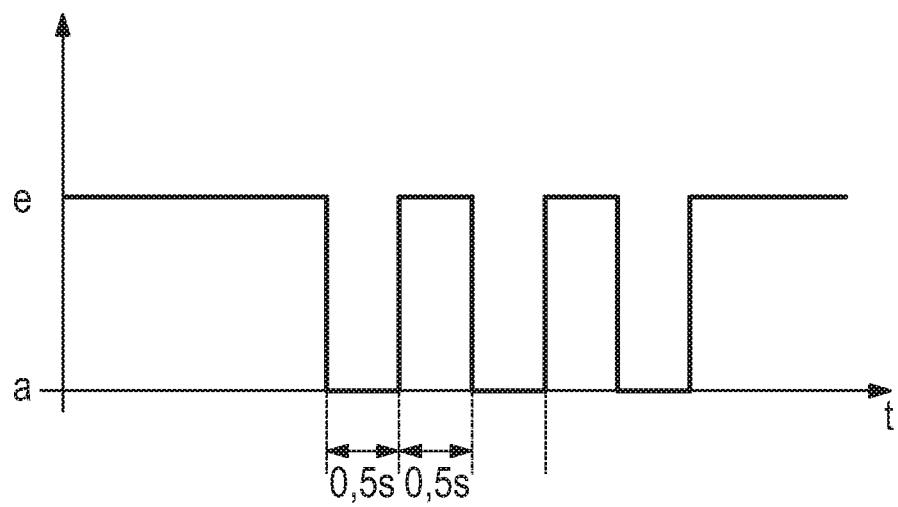
FIG. 5A-5B shows various diagrams showing a chronological sequence of a signal for controlling the illumination by the illumination arrangement.

FIG. 5A shows a diagram illustrating a chronological sequence of a signal for controlling the illumination by the illumination arrangement 32. The switched-on illumination of the illumination arrangement 32 is marked with e, a switched-off illumination with a. Following the chronological sequence, it can be seen that the illumination is first switched on and then switched off and on, respectively, three times every 0.5 seconds. Afterwards, the illumination is switched on again continuously.

The continuous illumination at the beginning and end of the chronological sequence represents the normal mode of operation. The sector showing the clocked (repeated) switching off and on represents the second signal mode of operation. The control unit 68 operates the illumination arrangement in the normal mode of operation if the workpiece sensors of the machine tool detect no workpiece in the workpiece mount. If, on the other hand, the workpiece sensors detect a workpiece in the workpiece mount, the normal mode of operation is terminated and replaced by a first signal mode of operation. If the workpiece sensors continue to detect an incorrect fit of the workpiece, the control unit sets the second signal mode of operation.

Figure 5B:
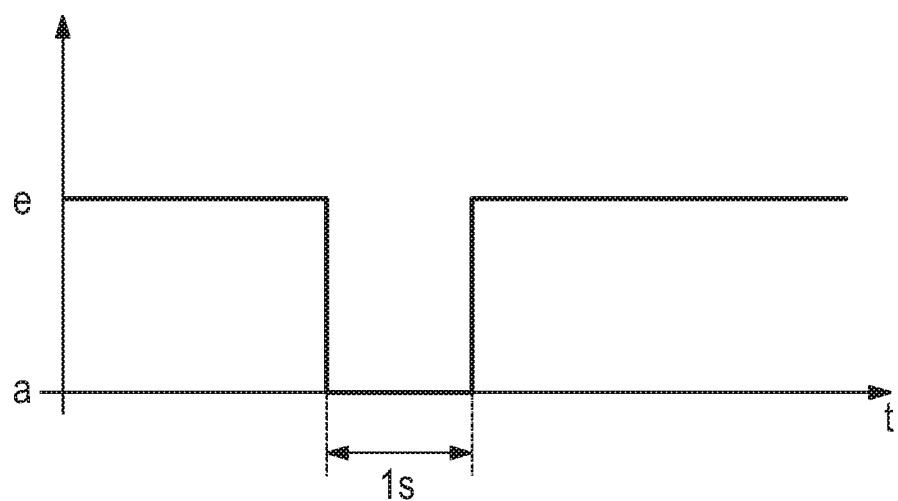

FIG. 5B shows another diagram, which also shows a chronological pattern of a signal sequence for controlling the illumination by the illumination arrangement 32. In this flow chart it can be seen that after some time the illumination is switched off once (for about one second). The illumination is then switched on again. Switching off the illumination arrangement once represents the first signal mode of operation. The control unit 68 sets this first signal mode of operation when a workpiece has been mounted correctly in the workpiece mount. The mode of operations of the illumination arrangement shown in FIG. 5A and FIG. 5B enable the operator to easily recognize the state of the workpiece in the workpiece mount.

Figure 6:
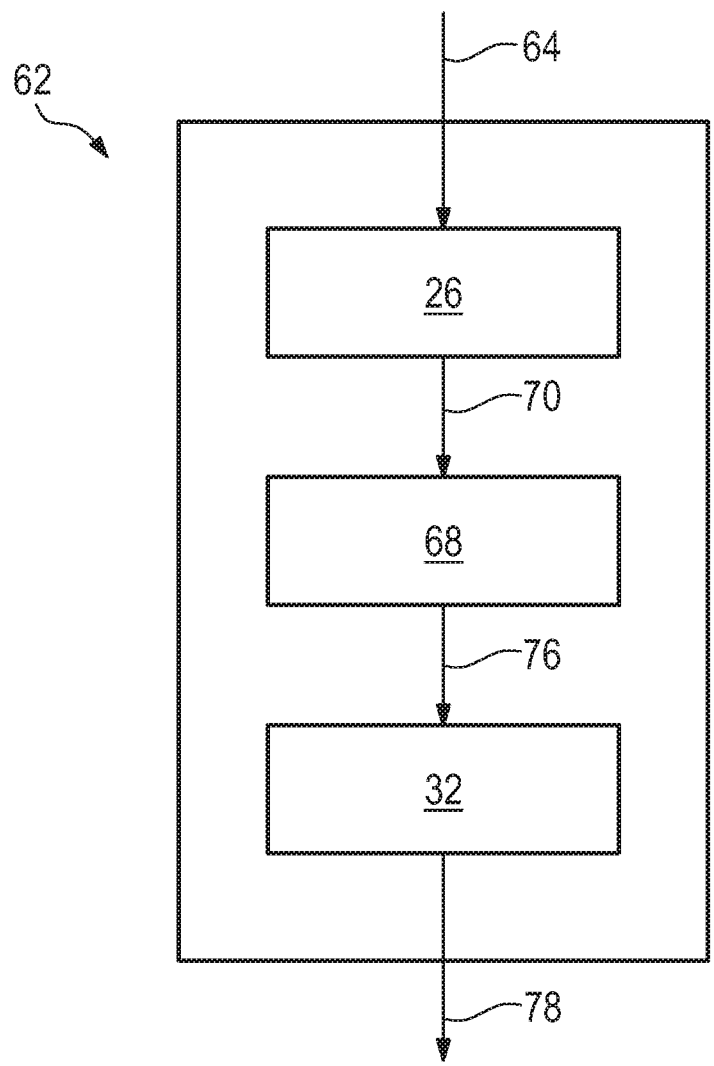
FIG. 6 is a block diagram illustrating an exemplary embodiment of a monitoring device.

FIG. 6 shows a block diagram of an exemplary embodiment of a monitoring device 62. In this embodiment the device 62 comprises a workpiece sensor 26, an (electronic)

control unit 68 and an illumination arrangement 32. The workpiece sensor 26 is configured to detect an ambient signal. For example, the workpiece sensor may be a pressure sensor, such as a dynamic pressure sensor, which is adapted to receive a pressure signal. Alternatively, the workpiece sensor 26 can be a light sensor (light barrier, etc.) configured to receive a light signal. Other sensor types are conceivable. Different types of sensors can be combined with each other. The workpiece sensor 26 provides the recorded ambient signal 64 as monitoring signal 70 to the control unit 68. The control unit 68 evaluates the monitoring signal 70. Depending on the result of the evaluation, a corresponding control signal 76 is transmitted to the illumination arrangement 32, which is responsible for controlling the illumination 78 of a working space of a machine tool. In this way, the correct reception of a workpiece, i.e. the correct loading of a workpiece mount, can be confirmed.

Figure 7:
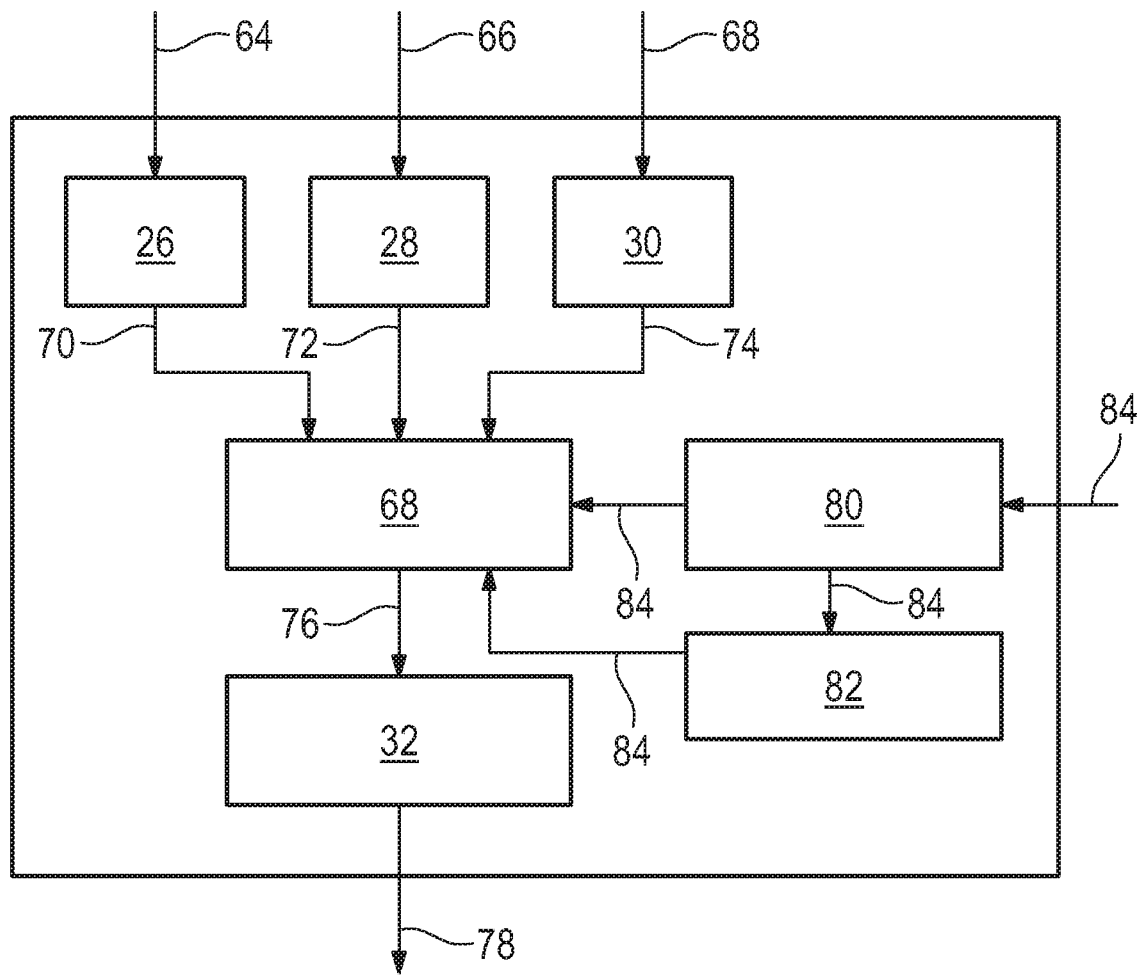
FIG. 7 is a block diagram illustrating another exemplary embodiment of a monitoring device.

FIG. 7 shows a block diagram of another exemplary embodiment of the device 62. In addition to three workpiece sensors 26, 28, 30, a control unit 68 and an illumination arrangement 32, this embodiment of the device 62 also comprises an input unit 80 and a memory unit 82. Each of the workpiece sensors 26, 28 and 30 is configured to detect a state signal 64, 66 and 68 and to convert it into a monitoring signal 70, 72 and 74. The control unit 68 receives these monitoring signals 70, 72, 74. In addition, the control unit 68 is configured to receive an operator input/selection 84. This is done either directly via the input unit 18 or via the memory unit 82. Possible input signals are, for example, reference values for the measurement of the workpiece sensors, i.e. measured pressure values for pressure sensors, but also settings relating to the number or configuration of the mode of operations of the illumination arrangement.

All data is then evaluated by the control unit 68 and the illumination arrangement 32 or its illumination 78 is controlled by means of a control signal 76 to confirm the loading/mounting of the workpiece mount.

Figure 8:
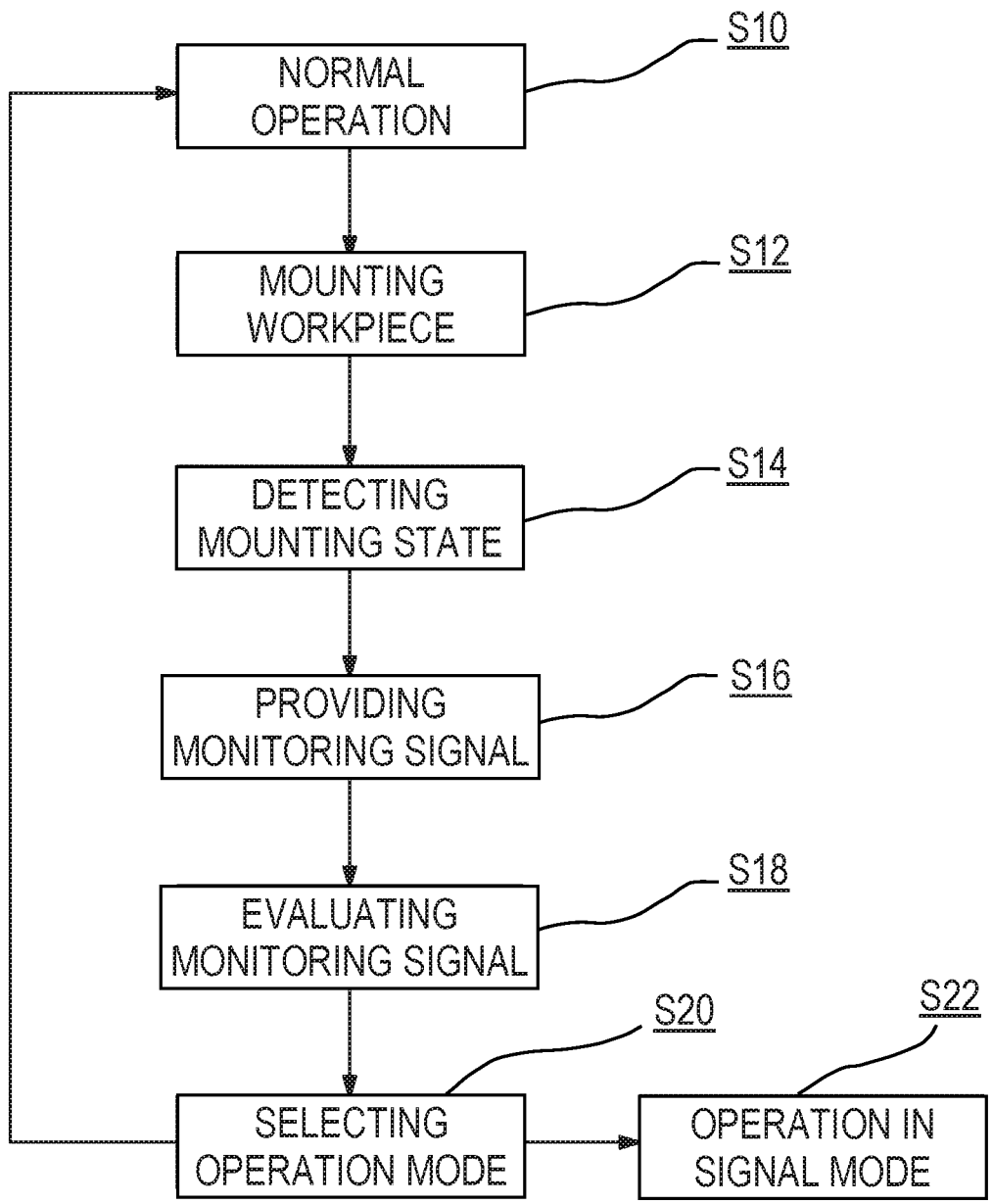
FIG. 8 is a flow chart illustrating an exemplary embodiment of a method for monitoring the mounting state of workpieces in a machine tool.

FIG. 8 shows a block diagram illustrating an exemplary embodiment of a method for monitoring the mounting state of a workpiece in a machine tool.

In a first step S10, an illumination arrangement is first operated in a normal mode of operation in order to illuminate a working space of the machine tool. Another step S12 comprises inserting a workpiece into a workpiece mount of a machine tool. A further step S14 comprises detecting the mounting state of the workpiece in the workpiece mount with a workpiece sensor. In a further step S16, the workpiece sensor then provides a monitoring signal that describes the mounting state of the workpiece.

The monitoring signal is evaluated in step S18. Depending on the mounting state of the workpiece, in a step S20, a corresponding specific mode of operation can be selected for the illumination arrangement to enable an optical feedback/confirmation already in the working space. It can be selected between a normal mode of operation and a (first) signal mode of operation. The signal mode of operation is selected if a workpiece has been correctly inserted into the workpiece mount.

In step S22, the illumination arrangement is then operated in the signal mode of operation to confirm the correct fit. Otherwise, the normal mode of operation will be maintained until the workpiece is correctly mounted in the workpiece mount. The method may begin again with step S10.

What is claimed is:

1. A device configured to monitor a mounting state of a workpiece in a workpiece mount in a working space of a machine tool, comprising an illumination arrangement operable for illuminating the working space in a normal mode of operation, wherein the illumination arrangement is further operable in at least one signal mode of operation, at least one workpiece sensor which is configured to detect an actual state of the workpiece in the workpiece mount and to provide a monitoring signal that describes the actual state of the workpiece, and a monitoring device that is configured to:

determine, on the basis of the monitoring signal, whether the workpiece is in a correct mounting state or an incorrect mounting state, and based thereon, operate the illumination arrangement in the signal mode of operation to provide visual information in the working space for visualizing the mounting state of the workpiece.

2. A machine tool comprising:

a frame, a working space with a workpiece mount for a workpiece, and a monitoring device for monitoring a mounting state of a workpiece in the workpiece mount the device, comprising an illumination arrangement operable for illuminating the working space in a normal mode of operation, wherein the illumination arrangement is further operable in at least one signal mode of operation, at least one workpiece sensor which is configured to detect an actual state of the workpiece in the workpiece mount and to provide a monitoring signal that describes the actual state of the workpiece, and a monitoring device that is configured to:

determine, on the basis of the monitoring signal, whether the workpiece is in a correct mounting state or an incorrect mounting state, and based thereon, operate the illumination arrangement in the signal mode of operation to provide visual information in the working space for visualizing the mounting state of the workpiece.

3. A device configured to monitor a mounting state of a workpiece in a workpiece mount of a machine tool, comprising:

an illumination arrangement that illuminates the workpiece mount in a normal mode of operation, at least one workpiece sensor that is configured to detect an actual state of the workpiece in the workpiece mount in the working space and to provide a monitoring signal which describes the actual state of the workpiece, and a monitoring device, wherein the illumination arrangement is further operable in at least one signal mode of operation, and wherein the monitoring device is configured to:

determine, on the basis of the monitoring signal, whether the workpiece is in a first mounting state or a second mounting state, and selectively operate the illumination arrangement in the signal mode of operation to provide visual information in the working space for visualizing the mounting state of the workpiece.

4. The device as claimed in claim 3, wherein the monitoring device assigns the actual state to the first mounting state, if the actual state corresponds with a target state, and wherein the monitoring device assigns the actual state to the second mounting state, if the actual state does not correspond with the target state.

5. The device as claimed in claim 4,
wherein the monitoring device operates the illumination arrangement in the signal mode of operation if the actual state is assigned to the first mounting state.

6. The device as claimed in claim 3,
wherein the illumination arrangement is integrated into the working space.

7. The device as claimed in claim 3,
wherein the illumination arrangement is operable in a first signal mode of operation and a second signal mode of operation,
wherein the monitoring device operates the illumination arrangement in the first signal mode of operation if the actual state is assigned to the first mounting state, and
wherein the monitoring device operates the illumination arrangement in the second signal mode of operation if the actual state is assigned to the second mounting state.

8. The device as claimed in claim 3,
wherein the illumination arrangement is operable to emit, visual binary or three-step signals over time.

9. The device as claimed in claim 3,
wherein the monitoring device is configured to deactivate and activate the illumination arrangement in the signal mode of operation.

10. The device as claimed in claim 3,
wherein the signal mode of operation comprises at least one of a change in illumination intensity and a change in color.

11. The device as claimed in claim 3,
wherein the actual state is dependent on a state variable that is selected from the group consisting of: presence, absence, position, orientation, a clamping state of the workpiece, and combinations thereof.

12. The device as claimed in claim 3,
wherein the at least one workpiece sensor a sensor is selected from the group consisting of mechanical sensors, optical sensors, inductive displacement sensors, electrical displacement sensors, pressure sensors, force sensors, and combinations thereof.

13. The device as claimed in claim 3,
wherein said at least one workpiece sensor is a dynamic pressure sensor.

14. The device as claimed in claim 3,
wherein the monitoring device is configured to determine, on the basis of the monitoring signal, whether the workpiece is in a correct mounting state or an incorrect mounting state.

15. The device as claimed in claim 3,
wherein the monitoring device is configured operate the illumination arrangement to provide an intermitted illumination in the signal mode of operation.

16. The device as claimed in claim 3,
wherein the illumination arrangement comprises at least one light source that emits white light.

17. The device as claimed in claim 3,
wherein the actual state of the workpiece is a mounting state.

18. The device as claimed in claim 3,
comprising an input unit configured to receive operator inputs for the monitoring device for controlling the illumination arrangement.

19. The device including the machine tool of claim 3 further comprising:
a frame,
a working space with a workpiece mount for receiving a workpiece, and
a monitoring device configured to monitor the mounting state of the workpiece in the workpiece mount.

20. A method for monitoring a mounting state of a workpiece in a workpiece mount in a working space or a defined surrounding area of a machine tool, the method comprising the steps of:
operating an illumination arrangement in a normal mode of operation for illuminating the working space,
receiving a workpiece in the workpiece mount in the working space,
identifying of the actual state of the workpiece in the workpiece mount in the working space,
providing a monitoring signal describing the actual state of the workpiece,
determining, on the basis of the monitoring signal, whether the workpiece is in a first mounting state or a second mounting state, and
based thereon, selectively operating the illumination arrangement in a signal mode of operation to provide visual information in the working space for visualizing the mounting state of the workpiece.

* * * * *